(12) United States Patent
Kaji (10) Patent No.: US 9,701,163 B2
(45) Date of Patent: Jul. 11, 2017

(54) PNEUMATIC TIRE

(71) Applicant: TOYO TIRE & RUBBER CO., LTD., Osaka-shi, Osaka (JP)

(72) Inventor: Shinichi Kaji, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 220 days.

(21) Appl. No.: 14/561,727

(22) Filed: Dec. 5, 2014

(65) Prior Publication Data

US 2015/0165828 A1 Jun. 18, 2015

(30) Foreign Application Priority Data

Dec. 18, 2013 (JP) .................................. 2013-261523

(51) Int. Cl.
*B60C 11/12* (2006.01)
*B60C 11/11* (2006.01)

(52) U.S. Cl.
CPC ........... *B60C 11/1281* (2013.01); *B60C 11/11* (2013.01); *B60C 11/1218* (2013.04); *B60C 2011/1209* (2013.04); *B60C 2011/1254* (2013.04)

(58) Field of Classification Search
CPC ......... B60C 11/1281; B60C 2011/1254; B60C 2011/1209; B60C 11/12
See application file for complete search history.

(56) References Cited

U.S. PATENT DOCUMENTS 4,723,584 A * 2/1988 Yamaguchi ........... B60C 11/032
152/209.17

FOREIGN PATENT DOCUMENTS

| JP | 01-101205 A | * | 4/1989 |
|---|---|---|---|
| JP | 06-055913 A | * | 3/1994 |
| JP | 8-197915 A | | 8/1996 |
| JP | 2009-160986 A | | 7/2009 |
| JP | 2010-208428 A | * | 9/2010 |
| JP | 2011-157011 A | * | 8/2011 |
| JP | 2011-157011 A | | 8/2011 |
| KR | 869025 B1 | * | 11/2008 |

OTHER PUBLICATIONS

Machine translation for Japan 2011-157011 (no date).*
Machine translation for Japan 2010-208428 (no date).*
Machine translation for Japan 01-101205 (no date).*
Machine translation for Korea 869025 B1 (no date).*
Machine translation for Japan 06-055913 (no date).*
Office Action dated May 18, 2016, issued in counterpart Chinese Application No. 201410677998.9, with English translation ( 9 pages).
Office Action dated Dec. 21, 2016, issued in counterpart Chinese Application No. 201410677998.9, with partial English translation. (11 pages).

* cited by examiner

*Primary Examiner* — Steven D Maki
(74) *Attorney, Agent, or Firm* — Westerman, Hattori, Daniels & Adrian, LLP (57) ABSTRACT

In a pneumatic tire, a sipe formed in a land portion includes a first large width portion having a larger groove width than an opening end formed on a surface of a tread, a neck portion having a smaller groove width than the first large width portion, and a second large width portion having a larger groove width than the neck portion which are disposed in this order on a depth side in a sipe depth direction.

6 Claims, 5 Drawing Sheets

PNEUMATIC TIRE

BACKGROUND OF THE INVENTION

Field of the Invention

The present invention relates to a pneumatic tire provided with a tread pattern having land portions where sipes are formed.

Background Art

Conventionally, for example, slits or slots referred to as sipes are formed on land portions of blocks or ribs of a studless tire thus enabling stable traveling on an icy road surface having a low friction coefficient by making use of an edge effect generated by the sipes. As such a sipe, there has been known a so-called three-dimensional sipe where the shape of the sipe is changed in the depth direction. Linear sipes which open linearly on a tread surface or wavy sipes which open in a wavy form on a tread surface have been proposed in JP-A-2011-157011, JP-A-8-197915 and JP-A-2009-160986, for example.

However, when the number of sipes formed on the land portion is increased, the rigidity of the land portion is lowered so that the land portion falls excessively. Accordingly, a ground contact area is decreased and, at the same time, a ground contact pressure is locally increased so that ice on an icy road surface is melted whereby a water membrane is liable to be formed thus giving rise to a drawback that a braking performance of a tire on an icy road surface is lowered. Further, when the land portion falls excessively, the land portion is liable to be worn non-uniformly or the fallen land portion rubs a road surface when the fallen land portion returns to an original position after being separated from the road surface thus also giving rise to a drawback that an abnormal sound is liable to be generated.

SUMMARY OF THE INVENTION

Accordingly, it is an object of the invention to provide a pneumatic tire which can suppress the generation of an abnormal sound due to a non-uniform wear of a land portion or rubbing between the land portion and a road surface by suppressing lowering of the rigidity of the land portion while enhancing a braking performance of the pneumatic tire on an icy road surface by making use of an edge effect of sipes formed on the land portion.

According to one aspect of the invention, there is provided a pneumatic tire provided with a tread pattern having land portions where sipes are formed, wherein the sipe includes: an opening end which opens at a tread surface, a first large width portion formed on a depth side in a sipe depth direction deeper than the opening end and having a larger groove width than the opening end; a neck portion formed on the depth side in the sipe depth direction deeper than the first large width portion and having a smaller groove width than the first large width portion; and a second large width portion formed on the depth side in the sipe depth direction deeper than the neck portion and having a larger groove width than the neck portion, wherein groove side walls of the sipe which face each other in an opposed manner are disposed away from each other thus gradually increasing the groove width as the groove side walls extend toward the first large width portion from the opening end, the groove side walls which face each other in an opposed manner are disposed closer to each other thus gradually decreasing the groove width as the groove side walls extend toward the neck portion from the first large width portion, and the groove side walls which face each other in an opposed manner are disposed away from each other thus gradually increasing the groove width as the groove side walls extend toward the second large width portion from the neck portion.

DETAILED DESCRIPTION OF THE INVENTION

Hereinafter, one embodiment of the invention is explained by reference to drawings.

Although not shown in the drawing, a pneumatic tire according to this embodiment includes a pair of left and right bead portions and a pair of left and right side wall portions, and a tread portion which is formed between both side wall portions so as to connect radially-outer end portions of the left and right side wall portions to each other. The pneumatic tire includes carcasses each of which extends between the pair of bead portions.

Figure 1:
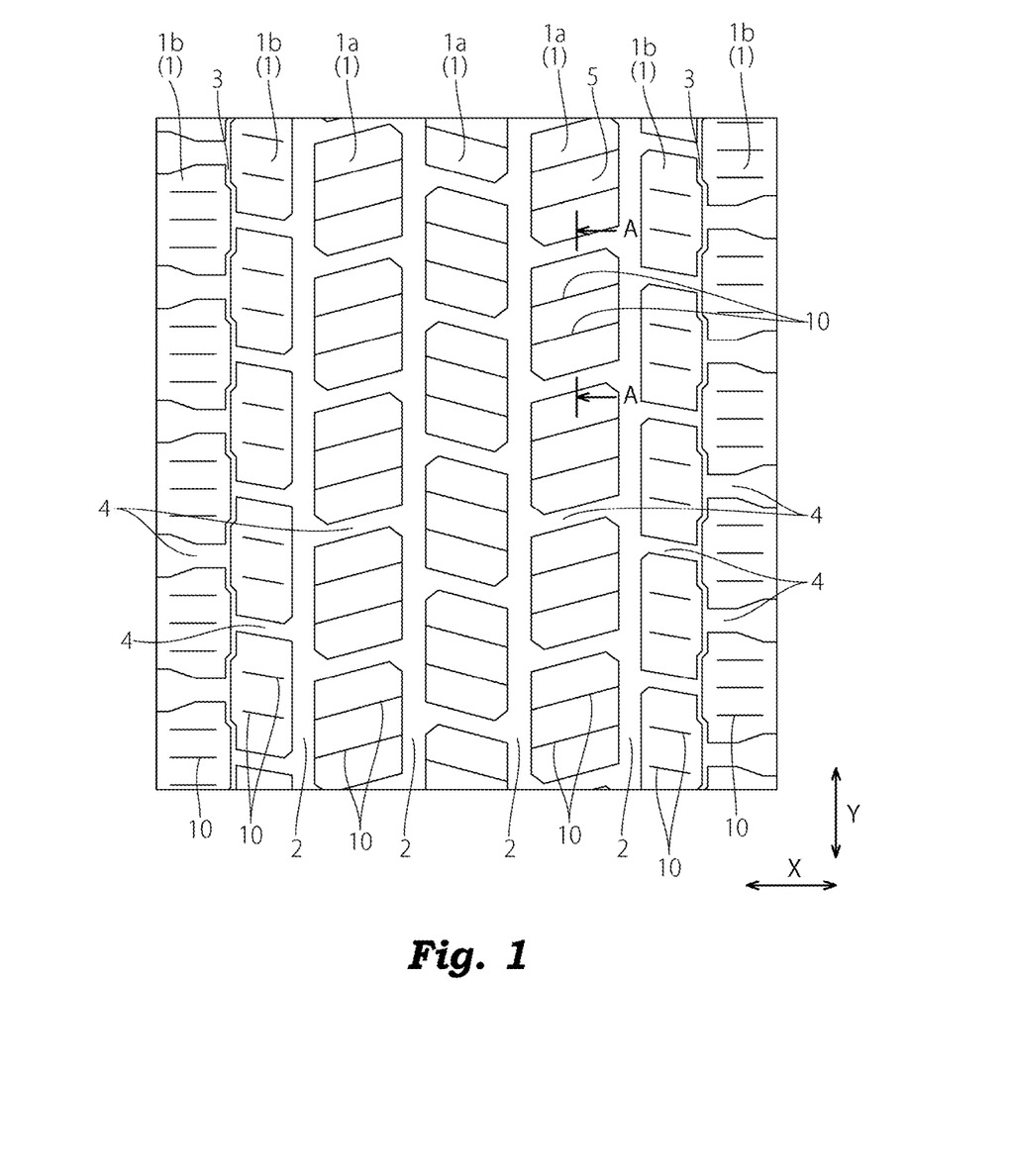
FIG. 1 is a developed view showing a tread pattern of a pneumatic tire according to a first embodiment of the invention.

As shown in FIG. 1, a surface of the tread portion is provided with a tread pattern T having land portions such as blocks 1 on which sipes 10 are formed, and constitutes a tread of the pneumatic tire. In this embodiment, the tread pattern T is defined into seven rows of blocks 1 arranged parallel to each other in the tire width direction X by four circumferential grooves 2 which extend in the tire circumferential direction Y, two sub grooves 3 which are disposed outside the four circumferential grooves 2 in the tire width direction and extend in the tire circumferential direction Y, and transverse grooves 4 which extend in the tire width direction X or in the direction inclined in the tire circumferential direction Y with respect to the tire width direction X.

In the respective blocks 1 which are defined by the circumferential grooves 2, the sub grooves 3 and the transverse grooves 4, the plurality of sipes 10 extending in the tire width direction X are formed at intervals in the tire circumferential direction Y.

The sipe 10 means a slit or slot which is formed in the land portion such as the block 1 and opens at the tread 5, and the sipe 10 has a minute groove width which is clearly differentiated from the grooves for defining the land portions such as the circumferential grooves 2, the sub grooves 3 and the transverse grooves 4. A groove width of the sipe 10 is not particularly limited, for example, a groove width of the sipe 10 at an opening end 12 which opens at the surface of the tread portion (that is, the tread 5) is 0.1 to 1.0 mm.

In this embodiment, the sipes 10 which are formed in three rows of center blocks 1a which are defined at a center portion in the tire width direction by four circumferential grooves 2 are formed of a both-open-ended sipe where both sides of the sipe in the tire width direction are opened at side wall surfaces of the center block 1a. The sipes 10 which are formed in four rows of shoulder blocks 1b defined outside four circumferential grooves 2 in the tire width direction are formed of a closed sipe where both ends of the sipe in the tire width direction terminate within the shoulder block 1b.

Next, the constitution of the sipe 10 is explained by reference to FIG. 2 to FIG. 4. Both of both-open-ended sipes formed in the center block 1a and the closed sipes formed in the shoulder block 1b have the same cross-sectional shape and provide the same manner of operation and advantageous effects and hence, in this specification, the explanation is made with respect to the both-open-ended sipes, and the detailed explanation of the closed sipes is omitted.

The sipes 10 have the same cross-sectional shape along the slit extending direction. To be more specific, as shown in FIG. 2, the sipe 10 has: a first large width portion 14 formed on a depth side D1 in a sipe depth direction deeper than an opening end 12 which opens at a surface 5 of a tread portion; a neck portion 16 formed on the depth side D1 in the sipe depth direction deeper than the first large width portion 14; a second large width portion 18 formed on the depth side D1 in the sipe depth direction deeper than the neck portion 16; and a groove bottom 20 which has an arcuate curved shape and is formed on a portion of the second large width portion 18 on the depth side D1 in the sipe depth direction. A cross-sectional shape of the sipe 10 has a line symmetrical shape using a straight line parallel to the sipe depth direction D as an axis of symmetry.

A groove width W2 of the first large width portion 14 is set larger than a groove width W1 of the opening end 12, and a pair of groove side walls 10a of the sipe 10 which faces each other in an opposed manner is inclined such that the groove-side walls 10a are gradually disposed away from each other as the groove side walls 10a extend to the first large width portion 14 from the opening end 12. A groove width W3 of the neck portion 16 is set smaller than the groove width W2 of the first large width portion 14, and the pair of groove side walls 10a which faces each other in an opposed manner is inclined such that the pair of groove side walls 10a gradually approaches each other as the pair of groove side walls 10a extends to the neck portion 16 from the first large width portion 14. A groove width W4 of the second large width portion 18 is set larger than the groove width W3 of the neck portion 16, and the pair of groove side walls 10a of the sipe 10 which faces each other in an opposed manner is inclined such that the groove side walls 10a are disposed away from each other as the groove side walls 10a extend to the second large width portion 18 from the neck portion 16.

That is, the pair of groove side walls 10a of the sipe 10 is inclined in the direction that the groove width is gradually increased as the pair of groove side walls 10a extends toward a depth side D1 in the sipe depth direction between the opening end 12 and the first large width portion 14, is inclined in the direction that the groove width is gradually decreased as the pair of groove side walls 10a extends toward the depth side D1 in the sipe depth direction between the first large width portion 14 and the neck portion 16, and is inclined in the direction that the groove width is gradually increased as the pair of groove side walls 10a extends toward the depth side D1 in the sipe depth direction between the neck portion 16 and the second large width portion 18.

On the depth side D1 in the sipe depth direction of the second large width portion 18, the groove bottom 20 which connects the opposedly facing groove side walls 10a to each other by a smoothly-curved surface is formed.

In this embodiment, the groove width W4 of the second large width portion 18 is set smaller than the groove width W2 of the first large width portion 14, and the sipe 10 has the largest groove width at the first large width portion 14. The neck portion 16 is disposed on a depth side D1 in the sipe depth direction deeper than an intermediate position of a depth H of the sipe 10 (that is, a length in the sipe depth direction D from the opening end 12 to the groove bottom 20 of the sipe 10), and the first large width portion 14 which is disposed between the opening end 12 and the neck portion 16 in the sipe depth direction D is disposed at a position closer to the neck portion 16 than to the opening end 12.

Figure 2:
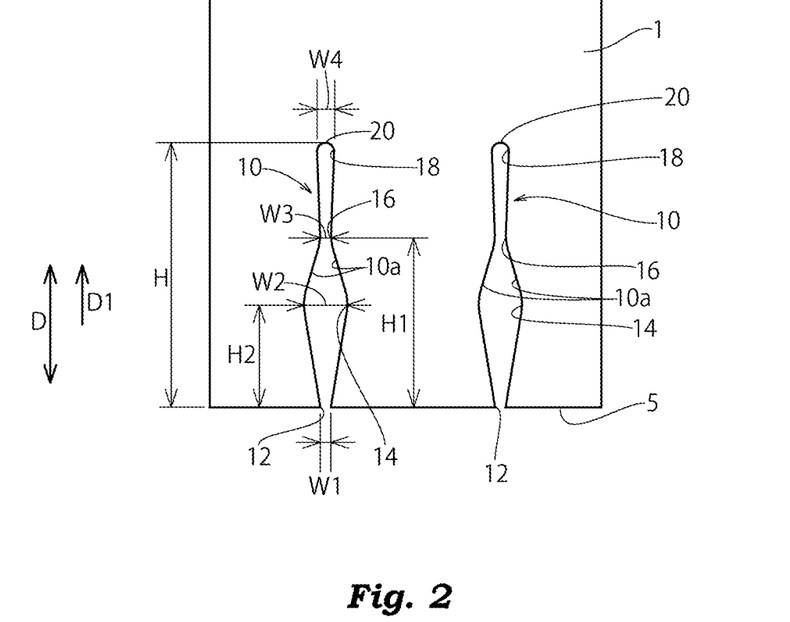
FIG. 2 is a cross-sectional view taken along a line A-A in FIG. 1.

To explain one example of sizes of the sipe 10 formed in the block 1 of the pneumatic tire according to this embodiment by reference to FIG. 2, assuming that a depth H of the sipe 10 is set to 15 mm, a length H1 in the sipe depth direction D from the opening end 12 to the neck portion 16 can be set to 9 mm, a length H2 in the sipe depth direction D from the opening end 12 to the first large width portion 14 can be set to 5.5 mm, the width W1 of the opening end 12 of the sipe 10 can be set to 0.3 mm to 1.0=(for example, 0.6 mm), the groove width W2 of the first large width portion 14 can be set 1.3 times to 5.0 times as large as the width W1 of the opening end 12 (for example, 2.5 mm), the groove width W3 of the neck portion 16 can be set to 0.6 mm to 0.8 mm (for example, 0.6 mm), and the groove width W4 of the second large width portion 18 can be set 1.3 times to 3.5 times as large as the groove width W3 of the neck portion 16 (for example, 1.2 mm).

Figure 3:
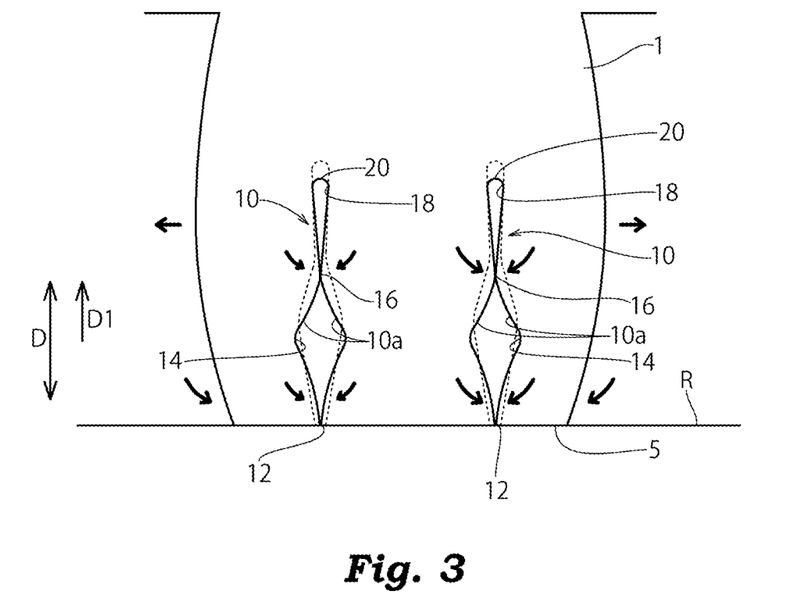
FIG. 3 is a cross-sectional view taken along a line A-A in FIG. 1 showing a ground contact state of the pneumatic tire.

In the above-mentioned pneumatic tire according to this embodiment, as shown in FIG. 3, when the tread 5 comes into contact with the road surface R so that a ground contact pressure acts on the block 1, a stress is generated in the direction that stress collapses the opening ends 12 and the neck portions 16 of the sipes 10 and, at the same time, a stress is generated in the direction that the stress increases the groove width of the first large width portion 14. Due to such stresses, the groove side walls 10a are brought into contact with each other at the opening end 12 and the neck portion 16 of the sipe 10 and hence, the block 1 is elastically deformed into a barrel shape in cross section as a whole.

Figure 4:
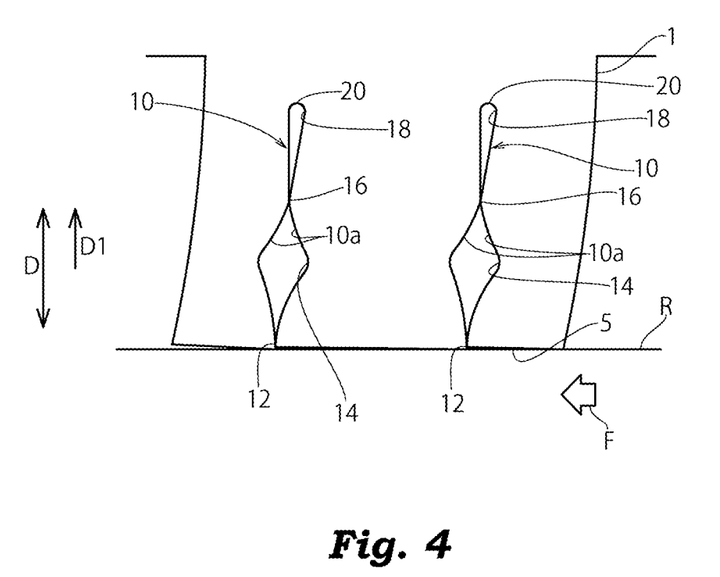
FIG. 4 is a cross-sectional view taken along a line A-A in FIG. 1 showing a state where the pneumatic tire receives a friction force from a road surface.

Accordingly, even when the pneumatic tire rolls on the road surface R and the tread 5 receives a friction force F from the road surface R as shown in FIG. 4, a portion or all friction forces F is canceled of offset by a stress in the direction that the stress collapses the opening end 12 of the sipe 10 which acts when the tread 5 comes into contact with the road surface R and, at the same time, the groove side walls 10a are locally brought into contact with each other at the neck portion 16 thus preventing the lowering of rigidity of the block 1 attributed to the sipe 10 whereby the block 1 minimally falls.

As a result, a ground contact pressure distribution becomes uniform thus ensuring a ground contact area of the whole block 1. Accordingly, the non-uniform wear of the block 1 can be reduced and a friction force between the pneumatic tire and the road surface R can be increased and, at the same time, it is possible to suppress a ground contact pressure from being locally increased so that thawing of ice on an icy road surface can be suppressed whereby a braking performance of the pneumatic tire on the icy road surface can be enhanced. Further, the block 1 minimally falls and hence, it is possible to suppress a phenomenon that the block 1 rubs the road surface R and generates an abnormal sound when the block 1 separates from the road surface R.

In the pneumatic tire of this embodiment, when the tread 5 comes into contact with a road surface and a ground contact pressure acts on the block 1, the groove side walls 10*a* are brought into contact with each other at the opening end 12 of the sipe 10 and hence, the rigidity of an edge portion of the opening end 12 is increased thus enhancing an edge effect produced by the sipe 10 and, at the same time, the opening end 12 can efficiently suck a water membrane existing on the road surface R into the inside of the sipe 10 by a capillary phenomenon thus enhancing a braking performance of the pneumatic tire.

In the pneumatic tire of this embodiment, the sipe 10 formed in the block 1 has the second large width portion 18 having a width larger than the groove width W3 of the neck portion 16 on a depth side D1 in the sipe depth direction deeper than the neck portion 16. Accordingly, it is possible to ensure a sufficient groove width at the groove bottom 20 of the sipe 10 while narrowing the groove width of the sipe 10 at the neck portion 16 for enhancing the rigidity of the block and hence, the occurrence of cracks which may start from the groove bottom 20 constituting a crack starting point can be prevented. Particularly, in this embodiment, the groove bottom 20 is curved, and the oppositely facing groove side walls 10*a* are connected to each other by the smoothly-curved surface and hence, the occurrence of cracks which may start from the groove bottom 20 constituting a crack starting point can be further prevented.

The sipe 10 is not limited to the above-mentioned both-open-ended sipe, and may be formed of a one-side open-ended sipe or a closed sipe. Further, the direction G along which the slit of the sipe 10 extends may be the direction parallel to the tire width direction X or may be the direction inclined with respect to the tire width direction X. The sipe 10 is not limited to a linear sipe where the opening end 12 extends straightly on the tread 5 of the block 1, and may be a wavy sipe where the opening end 12 extends in a wavy form on the tread 5.

A planar shape of the block 1 is not particularly limited, and the block 1 may be formed into any shape such as a rectangular shape, a rectangular parallelepiped shape, a triangular shape, a polygonal shape, or a shape basically formed of a curved line as viewed in a plan view. Further, the tread pattern is not always necessary to be configured such that all land portions are formed of blocks as shown in FIG. 1, and ribs may be formed in the tread pattern together with blocks. In this embodiment, the land portion where the sipes are formed is not limited to the block, and the sipes may be formed on the rib which extends in a straight manner or in a zigzag manner along the tire circumferential direction. Although the above-mentioned sipe constitution may be applied to all land portions in the tread pattern, the above-mentioned sipe constitution may be applied to only some land portions in the tread pattern.

The pneumatic tire of this embodiment can acquire a large land-portion falling suppression effect and hence, the pneumatic tire of this embodiment is useful as a tire provided with a tread pattern basically formed of blocks. Further, the pneumatic tire of this embodiment can improve ice performance and hence, the pneumatic tire is preferably applicable as a tire for winter such as a studless tire or a tire for all seasons. However, the pneumatic tire of this embodiment is also applicable as a so-called summer tire.

Although several embodiments have been explained heretofore, these embodiments have been proposed as examples, and are not intended to restrict the scope of the invention. These novel embodiments can be carried out in other various modes, and various omissions, replacements and changes can be made without departing from the gist of the invention.

EXAMPLES

To confirm the advantageous effects acquired by the above-mentioned embodiments, the following tire performances are evaluated. In the tire performance evaluation, it is assumed that the tire size is set to "11R22.5 14P. R.".

(1) Braking Performance on Icy Road Surface

A specimen tire was assembled to a rim having a size of 22.5×7.50, air was filled in the tire until an inner pressure became 700 KPa, and the specimen tire was mounted on all axles of a large truck having a vehicle total weight of 20 t and provided with an antilock braking system (ABS) and, thereafter, the large truck was made to travel on a linear icy road surface at 30 km/h under a load condition of 50% of maximum loading capacity, and a distance from a position at which braking was started to a position at which the vehicle was stopped was measured. The evaluation is indicated by an index with the inverse number of a braking distance of a comparison example 1 set as 100. The larger the numerical value the index, the more favorable the braking performance on an icy road surface becomes.

(2) Crack Resistance Performance and Non-Uniform Wear Resistance Performance

A specimen tire was assembled to a rim having a size of 22.5×7.50, air was filled in the tire until an inner pressure became 700 KPa, and the specimen tire was mounted on all axles of a large truck having a vehicle total weight of 20 t. At a point of time that the truck traveled 20000 Km on a public road, and also at a point of time that the truck traveled 40000 Km on a public road under a load condition of 80% of maximum loading capacity, the presence or the non-presence of cracks generated in the groove bottom 20 of the sipe 10 was observed, and the difference in height in the same block 10 was measured as an amount of step non-uniform wear.

(3) Noise Performance in Cabin

A specimen tire was assembled to a rim having a size of 22.5×7.50, air was filled in the tire until an inner pressure became 700 KPa, and the specimen tire was mounted on all axles of a large truck having a vehicle total weight of 20 t, and respective noise levels dB (A) when the truck traveled at 40 Km/h, 50 Km/h, 60 Km/h under a load condition of 100% of maximum loading capacity were measured. The evaluation is indicated by an index with a noise level of the comparison example 1 set as 100. The smaller the numerical value of the index, the more favorable the noise performance in a cabin becomes.

Example 1

In the example 1, the sipe 10 having the cross-sectional shape shown in FIG. 2 was formed on all blocks in the tread pattern T shown in FIG. 1. The respective sizes such as the depth H of the sipe 10, the length H1 in the sipe depth direction D from the opening end 12 to the neck portion 16, the length H2 in the sipe depth direction D from the opening end 12 to the first large width portion 14, the width W1 of the opening end 12 of the sipe 10, the groove width W2 of the first large width portion 14, the groove width W3 of the neck portion 16, and the groove width W4 of the second large width portion 18 are shown in Table 1.

Comparison Example 1

Figure 5:
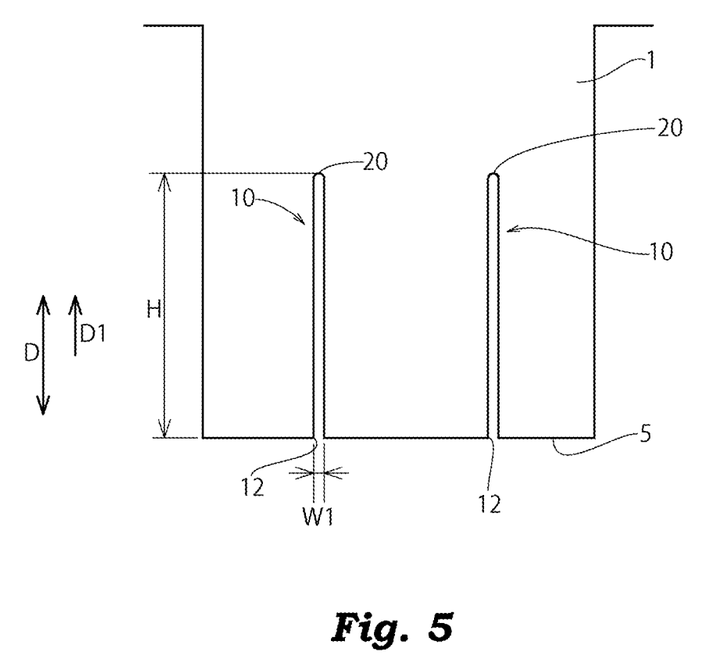
FIG. 5 is a cross-sectional view of sipes which are formed in land portions of a pneumatic tire according to a comparison example 1.

A tire of the comparison example 1 is a tire which was manufactured substantially in the same manner as the tire of the example 1 except for that a sipe having a fixed groove width in the sipe depth direction D as shown in FIG. 5 was formed in place of the sipe shown in FIG. 2. The respective sizes such as the depth H of the sipe 10 and the width W1 of the opening end 12 of the sipe 10 are shown in Table 1.

Comparison Example 2

Figure 6:
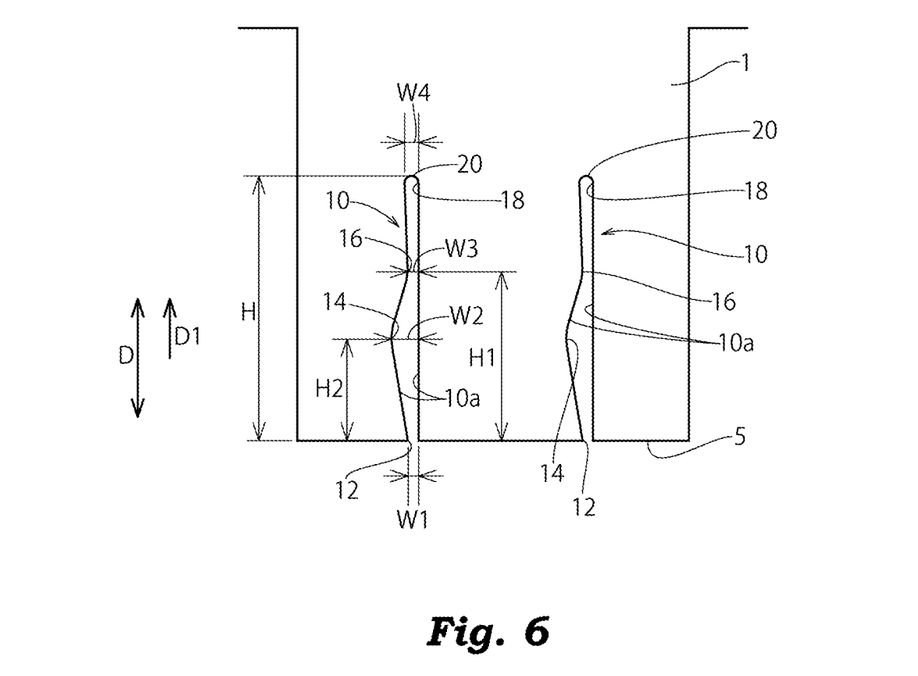
FIG. 6 is a cross-sectional view of sipes which are formed on land portions of a pneumatic tire according to a comparison example 2.

A tire of a comparison example 2 is a tire which was manufactured substantially in the same manner as the tire of the example 1 except for that, in place of the sipe shown in FIG. 2, a sipe was formed such that one of the oppositely facing groove side walls 10a shown in FIG. 6 (left groove side wall in FIG. 6) is formed of a flat surface parallel to the sipe depth direction D. The respective sizes such as the depth H of the sipe 10, the length H1 in the sipe depth direction D from the opening end 12 to the neck portion 16, the length H2 in the sipe depth direction D from the opening end 12 to the first large width portion 14, the width W1 of the opening end 12 of the sipe 10, the groove width W2 of the first large width portion 14, the groove width W3 of the neck portion 16, and the groove width W4 of the second large width portion 18 are shown in Table 1.

Comparison Example 3

Figure 7:
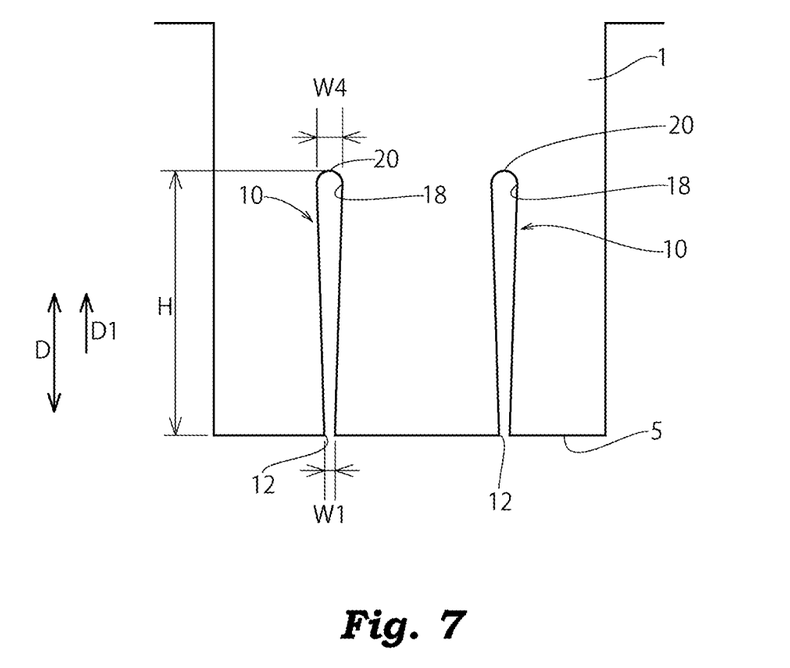
FIG. 7 is a cross-sectional view of sipes which are formed on land portions of a pneumatic tire according to a comparison example 3.

A tire of a comparison example 3 is a tire which was manufactured substantially in the same manner as the tire according to the example 1 except for that, in place of the sipe shown in FIG. 2, a sipe where a groove width is gradually increased from the opening end 12 to the groove bottom 20 as shown in FIG. 7 was formed. The respective sizes such as the depth H of the sipe 10, the width W1 of the opening end 12 of the sipe 10, and the groove width W4 of the second large width portion 18 are shown in Table 1.

The result of the evaluation is shown Table 1. The tire of the example 1 exhibits the excellent braking performance on an icy road surface compared to the tires of the comparison examples 1 to 3 and, at the same time, the tire of the example 1 can suppress the occurrence of cracks which may start from the groove bottom of the sipe constituting a crack starting point and the generation of non-uniform wear. Further, the tire of the example 1 can reduce the generation of noises in the cabin when a vehicle travels.

What is claimed is:

1. A pneumatic tire provided with a tread pattern having land portions where a sipe is formed, wherein
the sipe includes:
a first large width portion formed on a depth side in a sipe depth direction deeper than an opening end which opens at a tread surface and having a larger groove width than the opening end;
a neck portion formed on the depth side in the sipe depth direction deeper than the first large width portion and having a smaller groove width than the first large width portion; and
a second large width portion formed on the depth side in the sipe depth direction deeper than the neck portion and having a larger groove width than the neck portion, wherein
groove side walls of the sipe which face each other in an opposed manner are disposed away from each other thus gradually increasing the groove width as the groove side walls extend toward the first large width portion from the opening end,
the groove side walls which face each other in an opposed manner are disposed closer to each other thus gradually decreasing the groove width as the groove side walls extend toward the neck portion from the first large width portion,
the groove side walls which face each other in an opposed manner are disposed away from each other thus gradually increasing the groove width as the groove side walls extend toward the second large width portion from the neck portion, and
wherein the first large width portion has a larger groove width than the second large width portion.

2. The pneumatic tire according to claim 1, wherein the first large width portion is disposed closer to the neck portion than to the opening end in the sipe depth direction.

TABLE 1

| | | example | comparison example 1 | comparison example 2 | comparison example 3 |
|---|---|---|---|---|---|
| depth H(mm) of sipe | | 15 | 15 | 15 | 15 |
| length H1(mm) from opening end to neck portion | | 9 | — | 9 | — |
| length H2(mm) from opening end to first large width portion | | 5.5 | — | 5.5 | — |
| width W1(mm) of opening end | | 0.6 | 0.6 | 0.6 | 0.6 |
| groove width W2(mm) of first large width portion | | 2.5 | — | 1.5 | — |
| groove width W3(mm) of neck portion | | 0.6 | — | 0.6 | — |
| groove width W4(mm) of second large width portion | | 1.2 | — | 0.6 | 1.5 |
| braking performance on icy road surface | | 112 | 100 | 102 | 94 |
| presence or non-presence of cracks | 20000 Km | not present | present | present | not present |
| | 40000 Km | not present | present | present | not present |
| amount of non-uniform wear resistance (mm) | 20000 Km | 0.3 | 0.7 | 0.6 | 1.2 |
| | 40000 Km | 0.5 | 1.6 | 1.4 | 2.1 |
| noise in cabin | 40 Km/h | 86 | 100 | 95 | 104 |
| | 50 Km/h | 89 | 100 | 96 | 105 |
| | 60 Km/h | 91 | 100 | 98 | 105 |

3. The pneumatic tire according to claim 1, wherein a groove bottom of the sipe has a curved shape.

4. A pneumatic tire provided with a tread pattern having land portions where a sipe is formed, wherein
the sipe includes:
- a first large width portion formed on a depth side in a sipe depth direction deeper than an opening end which opens at a tread surface and having a larger groove width than the opening end;
- a neck portion formed on the depth side in the sipe depth direction deeper than the first large width portion and having a smaller groove width than the first large width portion; and
- a second large width portion formed on the depth side in the sipe depth direction deeper than the neck portion and having a larger groove width than the neck portion, wherein groove side walls of the sipe which face each other in an opposed manner are disposed away from each other thus gradually increasing the groove width as the groove side walls extend toward the first large width portion from the opening end, the groove side walls which face each other in an opposed manner are disposed closer to each other thus gradually decreasing the groove width as the groove side walls extend toward the neck portion from the first large width portion, the groove side walls which face each other in an opposed manner are disposed away from each other thus gradually increasing the groove width as the groove side walls extend toward the second large width portion from the neck portion, wherein a cross-sectional shape of the sipe is formed into a line symmetry shape with respect to a straight line which is parallel to the sipe depth direction as an axis of symmetry, and wherein the first large width portion has a larger groove width than the second large width portion.

5. The pneumatic tire according to claim 4, wherein the first large width portion is disposed closer to the neck portion than to the opening end in the sipe depth direction.

6. The pneumatic tire according to claim 4, wherein a groove bottom of the sipe has a curved shape.

* * * * *